US011535099B2

(12) United States Patent
Shimazaki et al.

(10) Patent No.: US 11,535,099 B2
(45) Date of Patent: Dec. 27, 2022

(54) POWER TRANSMISSION DEVICE FOR A FOUR-WHEEL DRIVE VEHICLE

(71) Applicants: Kanzaki Kokyukoki Manufacturing Co., Ltd., Amagasaki (JP); KAWASAKI JUKOGYO KABUSHIKI KAISHA, Kobe (JP)

(72) Inventors: Keisei Shimazaki, Amagasaki (JP); Michio Tsukamoto, Amagasaki (JP); Ayumi Hamada, Kobe (JP)

(73) Assignees: KANZAKI KOKYUKOKI MANUFACTURING CO., LTD., Amagasaki (JP); KAWASAKI MOTORS, LTD., Hyogo (JP)

( * ) Notice: Subject to any disclaimer, the term of this patent is extended or adjusted under 35 U.S.C. 154(b) by 162 days.

(21) Appl. No.: 16/725,193

(22) Filed: Dec. 23, 2019

(65) Prior Publication Data
US 2020/0215906 A1 Jul. 9, 2020

Related U.S. Application Data

(60) Provisional application No. 62/789,202, filed on Jan. 7, 2019.

(51) Int. Cl.
*B60K 17/342* (2006.01)
*B60K 17/22* (2006.01)
(Continued)

(52) U.S. Cl.
CPC ............ *B60K 17/342* (2013.01); *B60K 17/04* (2013.01); *B60K 17/22* (2013.01); *F16H 37/02* (2013.01);
(Continued)

(58) Field of Classification Search
CPC ...... B60K 17/342; B60K 17/22; B60K 17/04; B60K 23/08; B60K 2005/003; B60K 5/04;
(Continued)

(56) References Cited

U.S. PATENT DOCUMENTS 1,735,984 A * 11/1929 Straussler .............. B60K 17/34
180/233
5,267,477 A * 12/1993 Irikura .................... B60K 17/00
180/53.1
(Continued)

FOREIGN PATENT DOCUMENTS

GB 2230497 A * 10/1990 ............... B60K 5/04

*Primary Examiner* — Victor L MacArthur
(74) *Attorney, Agent, or Firm* — Cantor Colburn LLP

(57) ABSTRACT

[Technical problem] To provide a power transmission mechanism for a four-wheel drive vehicle in which a prime mover is disposed at a low position to lower the center of gravity of the vehicle while a driving path from a transmission to a front wheel differential mechanism is also shortened. [Solutions] In a power transmission mechanism for a four-wheel drive vehicle, the power of a prime mover is transmitted to a front wheel differential mechanism which is disposed in front of the prime mover, and to a rear wheel differential mechanism which is disposed behind a transmission, through the transmission which is disposed behind the prime mover. The transmission comprises a front and rear wheel drive shaft that extends along the longitudinal direction of the vehicle body. The transmission is arranged separately from the prime mover and a rear axle drive device. The rear end portion of the front and rear wheel drive shaft is connected to an input shaft of the rear wheel differential mechanism. The front end portion of the front and rear wheel drive shaft is connected to an input shaft of the front wheel differential mechanism via a front wheel power transmission shaft that extends along the longitudinal
(Continued)

direction of the vehicle body and passes through the space beneath the prime mover. The front wheel differential mechanism, the prime mover, the transmission, and the rear wheel differential mechanism are arranged along the longitudinal direction of the vehicle body at the center of the vehicle width of the vehicle.

8 Claims, 14 Drawing Sheets

(51) Int. Cl.
*F16H 37/02* (2006.01)
*B60K 17/04* (2006.01)

(52) U.S. Cl.
CPC .. *F16H 2200/0034* (2013.01); *F16H 2702/00* (2013.01)

(58) Field of Classification Search
CPC ....... B60K 17/08; B60K 17/344; F16H 37/02; F16H 2200/0034; F16H 63/18; F16H 3/089; F16H 37/021; B60Y 2200/20; B60Y 2400/72; B60Y 2400/422
See application file for complete search history.

(56) References Cited

U.S. PATENT DOCUMENTS

| | | | |
|---|---|---|---|
| 6,076,624 A | 6/2000 | Izumi et al. | |
| 6,860,358 B1 * | 3/2005 | Hauser | B60K 17/105 180/305 |
| 7,559,865 B2 * | 7/2009 | Ishii | B60K 17/28 180/242 |
| 7,644,789 B2 | 1/2010 | Miyazaki et al. | |
| 8,403,094 B2 * | 3/2013 | Kochidomari | B60K 17/08 180/233 |
| 2014/0248994 A1 * | 9/2014 | Kochidomari | B60K 17/08 477/36 |
| 2015/0197145 A1 * | 7/2015 | Kochidomari | B60K 17/043 180/243 |
| 2016/0040724 A1 * | 2/2016 | Ebihara | B60T 1/062 74/11 |

* cited by examiner

A-A CROSS-SECTIONAL

D-D CROSS-SECTIONAL

F-F CROSS-SECTIONAL

POWER TRANSMISSION DEVICE FOR A FOUR-WHEEL DRIVE VEHICLE

CROSS REFERENCE TO RELATED APPLICATION

The present application claims priority under 35 U.S.C. § 119 to the U.S. Provisional Application No. 62/789,202, filed on Jan. 7, 2019, the entire content of which is incorporated herein by reference in its entirety.

TECHNICAL FIELD

The present invention relates to a power transmission device for a four-wheel drive vehicle.

BACKGROUND

Such multi-purpose four-wheel drive vehicles as ATV (All Terrain Vehicle), UTV (Utility Task Vehicle), and ROV (Recreational Off highway Vehicle) suitable for rough terrain driving, the engine power is transmitted via the transmission which is arranged in the rear of the engine to the front wheel differential mechanism disposed in front of the engine and to the rear wheel differential mechanism disposed in the rear of the transmission (see, for example, Patent Documents 1 and 2).

Patent Document 1 discloses a power unit in which an engine and a transmission are integrated. Patent Document 2 discloses a configuration in which a front wheel drive shaft is provided so as to project outward from one side surface of a transmission integrated with a rear axle, and a propeller shaft is provided to detour around the engine.

PRIOR ART DOCUMENTS

Patent Literature

[Patent Document 1] U.S. Pat. No. 6,076,624
[Patent Document 2] U.S. Pat. No. 7,644,789

SUMMARY OF THE INVENTION

Problems to be Solved by the Invention

In the power transmission mechanism of Patent Document 2, the front wheel power transmission shaft (propeller shaft) that transmits power to the front wheel differential mechanism is provided to detour around the engine in a plan view, giving rise to the problem that the universal joint connected to both ends of the front wheel power transmission shaft was greatly inclined to increase noise with also reduced transmission efficiency. Moreover, the multi-purpose four-wheel drive vehicle disclosed in Patent Document 2 uses a power unit where an engine and a transmission are integrated, which constitutes a dedicated product with poor versatility and increased manufacturing costs.

The present invention addresses the technical problem by providing a power transmission device for a four-wheel drive vehicle which aims to improve the above-described present situations.

Means for Solving the Problems

A power transmission mechanism for a four-wheel drive vehicle comprising; a prime mover; a transmission disposed in the rear of the prime mover; a front wheel differential mechanism disposed in front of the prime mover; and a rear wheel differential mechanism disposed in the rear of the transmission; wherein, the power of the prime mover is transmitted via the transmission to the front wheel differential mechanism and the rear wheel differential mechanism; wherein, the transmission which is provided with a front and rear wheel drive shaft extending in the longitudinal direction of a vehicle body is provided separated from the prime mover and the rear wheel differential mechanism; wherein, a rear end of the front and rear wheel drive shaft is connected to the input portion of the rear wheel differential mechanism, wherein, a front end of the front and rear wheel drive shaft is connected to the input portion of the front wheel differential mechanism via a front wheel power transmission shaft extending in the longitudinal direction of the vehicle body and passing through the space beneath the prime mover; and wherein, the front wheel differential mechanism, the prime mover, the transmission and the rear wheel differential mechanism are provided in the longitudinal direction of the vehicle body and at the center of the vehicle width.

According to the present invention, since the prime mover and the transmission are arranged separated from each other so that a general-purpose prime mover can be used, and the prime mover can be arranged at a low position to lower the center of gravity of the vehicle and stability is improved. Furthermore, since the front wheel power transmission shaft is passed through the space beneath the prime mover along the longitudinal direction of the vehicle body at the center of the vehicle width, the drive path from the transmission to the front wheel differential mechanism can be shortened, so that not only the front wheel drive layout can be simplified, reduced noise and improved transmission efficiency can also be realized.

In the power transmission mechanism for a four-wheel drive vehicle according to the present invention, the input portion of the rear wheel differential mechanism is positioned higher from where is the bottom surface of the prime mover, and the front and rear wheel drive shaft is supported to the transmission in a front-lowered orientation.

According to this embodiment, by supporting the front and rear wheel drive shaft in a front-lowered manner, the input shaft of the rear wheel differential mechanism is supported in a front-lowered manner while securing the rear wheel differential mechanism to be located at a higher position, the input shaft of the input portion of the rear wheel differential mechanism could be provided on the same axis as the front and rear wheel drive shaft. Moreover, the rear end portion of the front and rear wheel drive shaft and the input shaft of the rear wheel differential mechanism are connected by a cylindrical shaft coupling such as a coupling, whereby the efficiency of power transmission from the front and rear wheel drive shaft to the rear wheel differential mechanism can be improved and noise can be suppressed.

Further, in the power transmission mechanism for a four-wheel drive vehicle of the present invention, the input portion of the rear wheel differential mechanism is positioned at substantially the same height as a connection portion between the front and rear wheel drive shaft and the front wheel power transmission shaft; wherein the front and rear wheel drive shaft is supported to the transmission in a substantially horizontal orientation.

According to this embodiment, the input shaft of the input portion of the rear wheel differential mechanism can be supported to orientate substantially horizontally and provided on the same axis as the front and rear wheel drive shaft, and the rear end portion of the front and rear wheel drive shaft and the input shaft of the rear wheel differential mechanism are connected by a cylindrical shaft coupling such as a coupling, so that the efficiency of power transmission from the front and rear wheel drive shaft to the rear wheel differential mechanism can be improved and noise can be suppressed. Furthermore, even if the interval in the longitudinal direction between the transmission and the rear wheel differential mechanism is changed, without significantly changing the structure of the transmission and the rear wheel differential mechanism, the rear end potion of the front and rear wheel drive shaft can be connected to an input shaft as an input portion of the rear wheel differential mechanism, and the versatility of the power transmission mechanism is hence improved.

In such an embodiment, by using a hypoid gear mechanism and a biaxial parallel shaft gear mechanism as the input gear mechanism of the rear wheel differential mechanism, the rear wheel differential mechanism is secured at a higher position, while the input shaft of the rear wheel differential mechanism can be supported to orient substantially horizontally and to the lower part of the rear wheel differential mechanism. Furthermore, the front wheel power transmission shaft is disposed in a substantially horizontal orientation and provided on the same axis as the front and rear wheel drive shaft, so that the front end of the front and rear wheel drive shaft and the rear end of the first front wheel power transmission shaft can be connected to each other by a cylindrical shaft coupling, so that the efficiency of power transmission from the front and rear wheel drive shaft to the first front wheel power transmission shaft can be improved and noise can be suppressed.

In the power transmission mechanism for a four-wheel drive vehicle of the present invention, the prime mover is provided with a power output shaft extending in the horizontal direction of the vehicle body, and the transmission is provided with a power input shaft extending in the horizontal direction of the vehicle body, with the transmission being configured to locate separated from and behind the prime mover, wherein the power output shaft and the power input shaft are connected with each other by an endless body.

According to this embodiment, a general-purpose prime mover can be used, and the output of the prime mover can be input to the transmission via an endless body which is provided on the side of the prime mover and the transmission. For example, an endless body of a continuously variable transmission (CVT), an endless body of a chain transmission mechanism without a speed change function, or an endless body of a belt transmission mechanism can be used as such an endless body.

Effects of the Invention

According to the power transmission mechanism for a four-wheel drive vehicle of the present invention, the prime mover is disposed at a low position to lower the center of gravity of the vehicle while the driving path from the front wheel differential mechanism to the transmission is also shortened.

MODE FOR CARRYING OUT THE INVENTION

Figure 1:
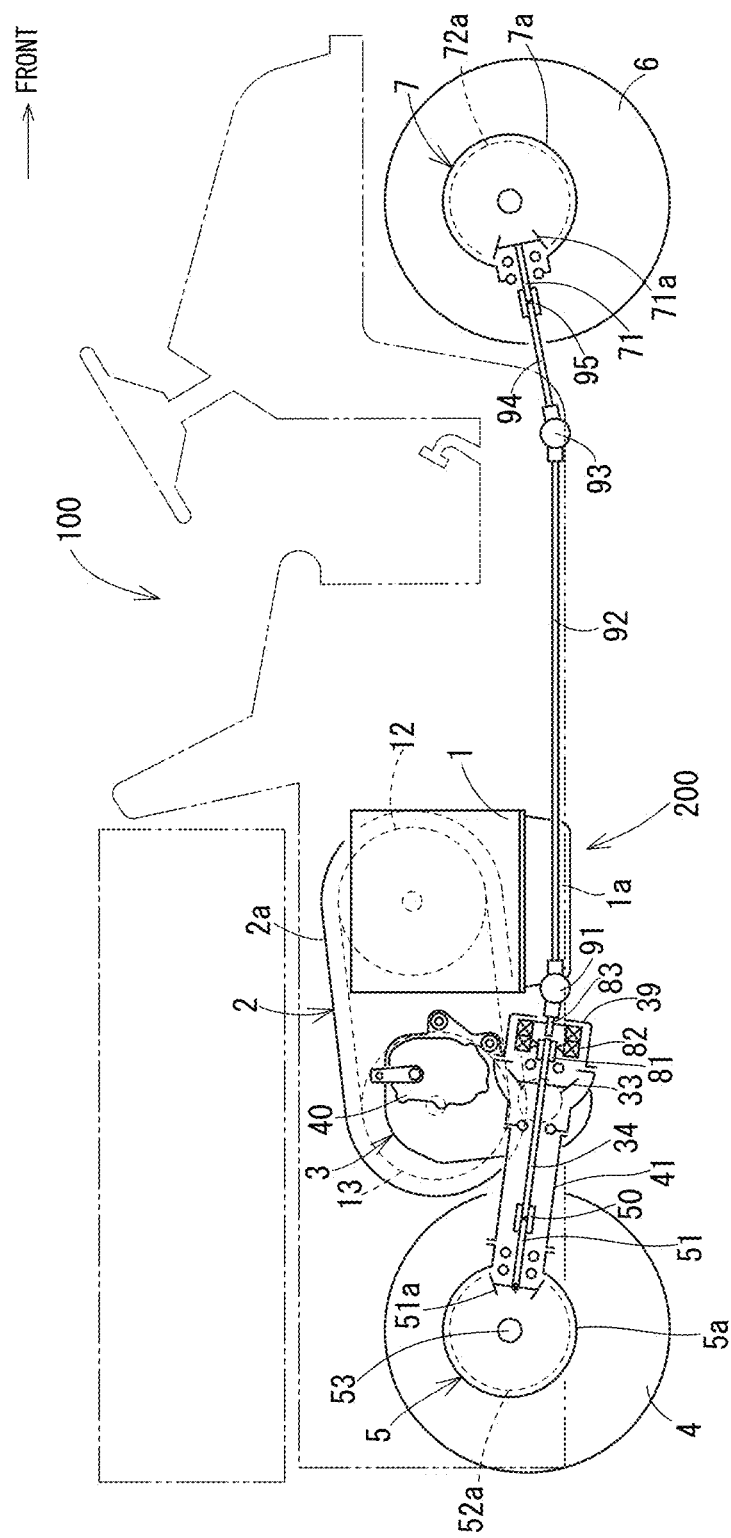
FIG. 1 is a side view schematically showing a power transmission mechanism of a vehicle according to one embodiment of the present invention.
Figure 2:
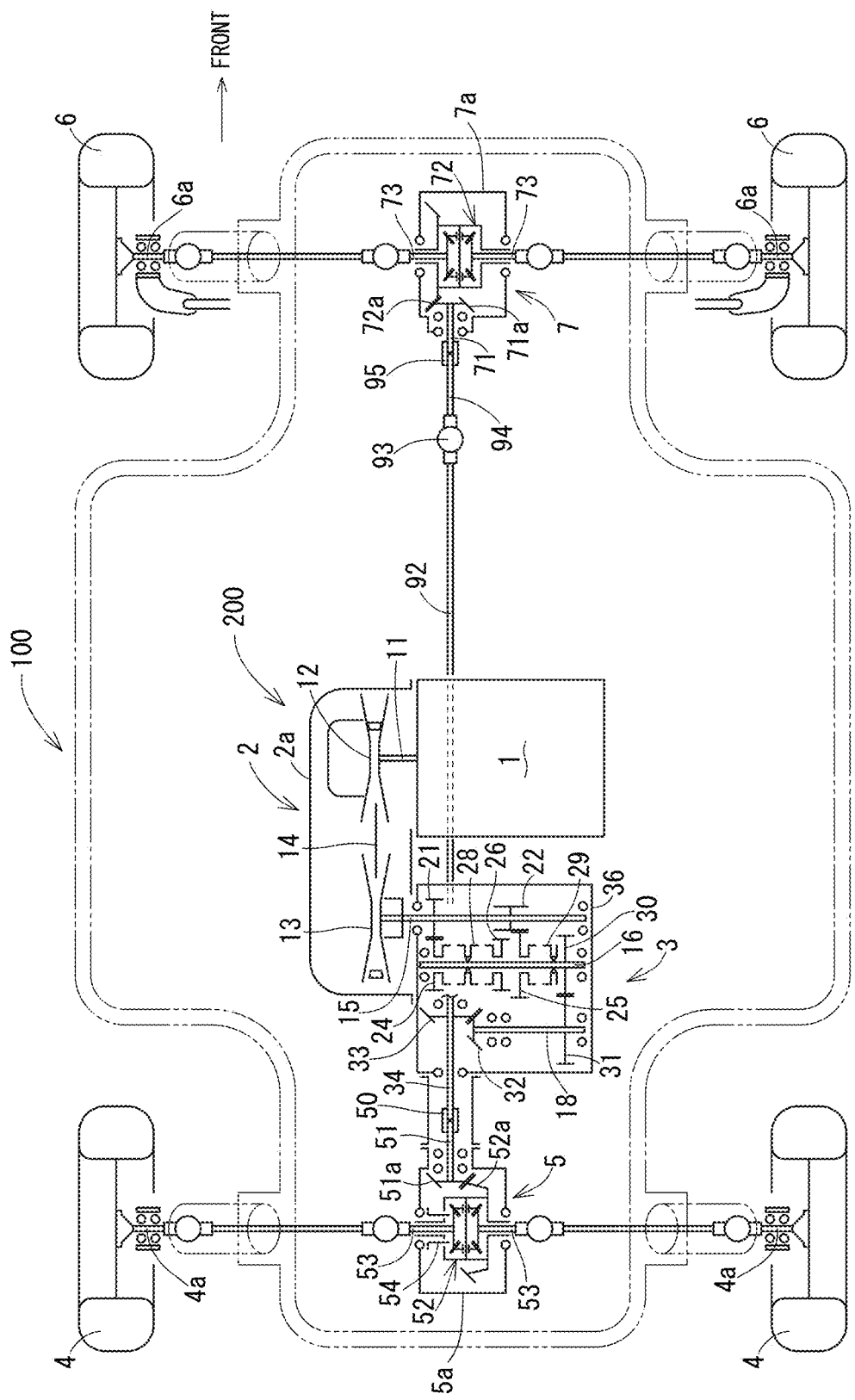
FIG. 2 is a schematic plan view partially showing the power transmission mechanism of FIG. 1 in a skeleton diagram.
Figure 3:
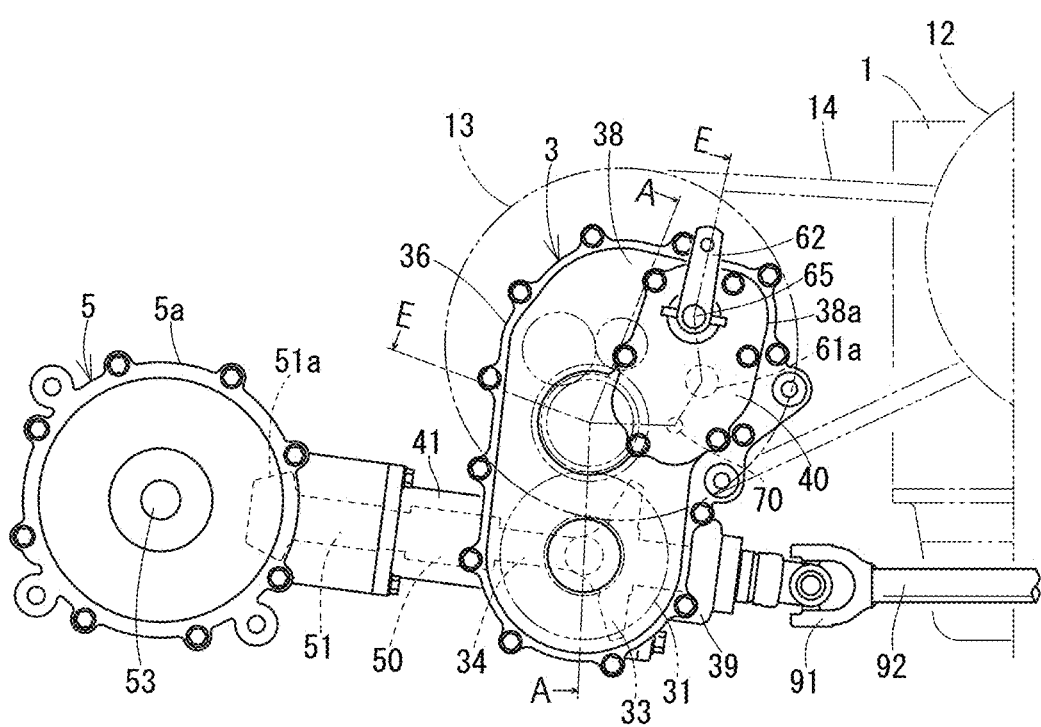
FIG. 3 is a right side view showing the gear transmission and the rear axle drive device of the embodiment.
Figure 4:
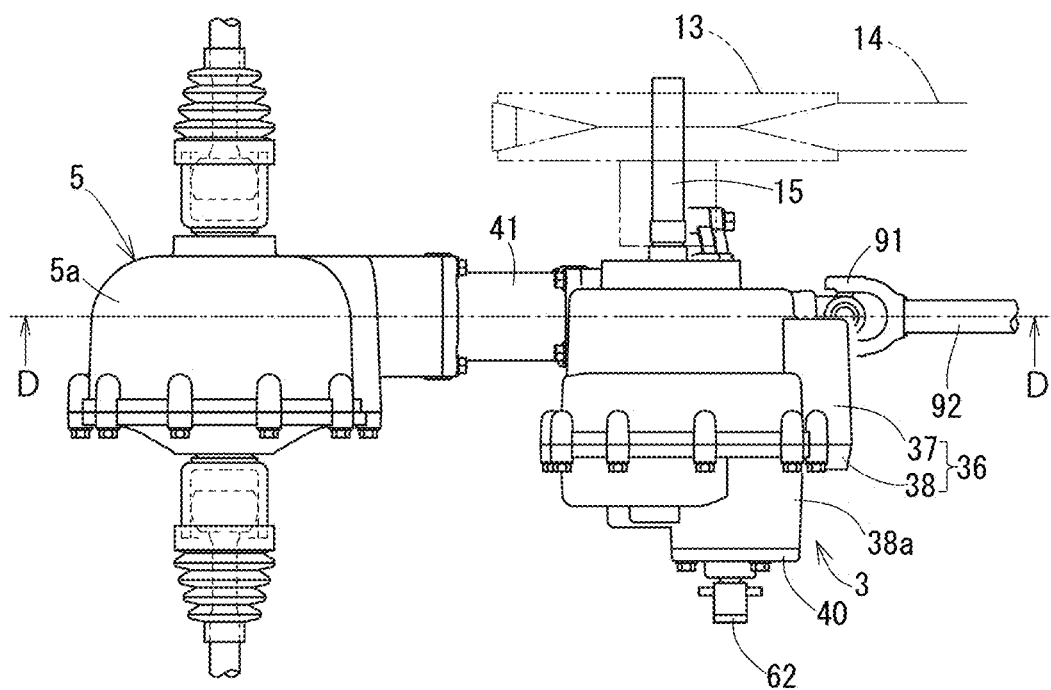
FIG. 4 is a plan view showing the gear transmission and the rear axle drive device.

Hereinafter, embodiments embodying the present invention will be described with reference to the drawings. As shown in FIG. 1 and FIG. 2, in the power transmission mechanism 200 for the four-wheel drive vehicle 100 of the present embodiment, the power of the engine 1 as a prime mover is transmitted to the front wheel differential mechanism 72 in the front axle drive device 7 which is disposed in front of the engine 1, and to the rear wheel differential mechanism 52 in the rear axle drive device 5 which is disposed behind the gear transmission 3, through the gear transmission 3 which is used as a transmission and is disposed behind the engine 1. As shown in FIG. 3, the gear transmission 3 includes a front and rear wheel drive shaft 34 that extends along the longitudinal direction of the vehicle body on the lower side inside the gear transmission housing 36. The gear transmission 3 is arranged separately from the engine 1 and the rear axle drive device 5.

The rear end portion of the front and rear wheel drive shaft 34 is connected to an input shaft 51 as an input portion of the rear wheel differential mechanism 52. The front end portion of the front and rear wheel drive shaft 34 is connected to an input shaft 71 as an input portion of the front wheel differential mechanism 72 via a front wheel power transmission shaft 92 that extends along the longitudinal direction of the vehicle body and passes through the space beneath the engine 1. In the power transmission mechanism 200, the front wheel differential mechanism 72, the engine 1, the gear transmission 3, and the rear wheel differential mechanism 52 are arranged along the longitudinal direction of the vehicle body at the center of the vehicle width of the vehicle 100.

In the power transmission mechanism 200 for the four-wheel drive vehicle 100 of the present embodiment, the engine 1 and the gear transmission 3 are separately disposed, so that the general-purpose engine 1 can be adopted and the engine 1 is disposed at a low position so that the center of gravity of the vehicle 100 can be lowered to improve the stability. Furthermore, since the power transmission mechanism 200 allows the front wheel power transmission shaft 92 to pass through the space beneath the engine 1 along the longitudinal direction of the vehicle body at the center of the vehicle width of the vehicle 100, the driving path from the front transmission differential mechanism 72 to the gear transmission 3 is shortened, the front wheel drive layout can therefore be simplified, and noise reduction and improved transmission efficiency is achieved.

Next, an embodiment of the power transmission mechanism 200 for the four-wheel drive vehicle 100 will be described more specifically with reference to FIG. 1 to FIG. 9. As shown in FIG. 1 and FIG. 2, the power transmission mechanism 200 of the vehicle 100 includes an engine 1 as a prime mover, a belt transmission 2 driven by the engine 1, and a gear transmission 3 as a transmission driven by the belt transmission 2. In the back of the gear transmission 3 is provided a rear axle drive device 5 for driving a pair of left and right rear wheels 4 and a rear axle 4a. A front axle drive device 7 that drives a pair of left and right front wheels 6 and a front axle 6a is provided in front of the engine 1. The output of the gear transmission 3 is distributed and transmitted to the rear axle drive device 5 and the front axle drive device 7.

The rear axle drive device 5 supports an input shaft 51 extending in the longitudinal direction of the vehicle body and a pair of left and right output shafts 53 extending in the horizontal direction in a plan view in the rear axle drive housing 5a as a housing. The front end portion of the input shaft 51 protrudes forward from the rear axle drive housing 5a, to be connected via the shaft coupling 50 to the rear wheel drive shaft 34 which protrudes rearward from a lower left portion of a rear surface of a gear transmission housing 36 (to be described later) in the gear transmission 3.

Respective output shaft 53 of the rear axle drive device 5 protrudes left- and right-ward from the rear axle drive housing 5a and is interlocked and connected to the rear axle 4a of respective left and right rear wheel 4 via a universal joint and a transmission shaft. A rear wheel differential mechanism 52 is housed inside the rear axle drive housing 5a, and the left and right output shafts 53 are connected to each other through the rear wheel differential mechanism 52 to operate differentially. A bevel ring gear 52a as an input gear of the rear wheel differential mechanism 52 meshes with a bevel pinion gear 51a which is fixed to the rear end of the input shaft 51.

Figure 7:
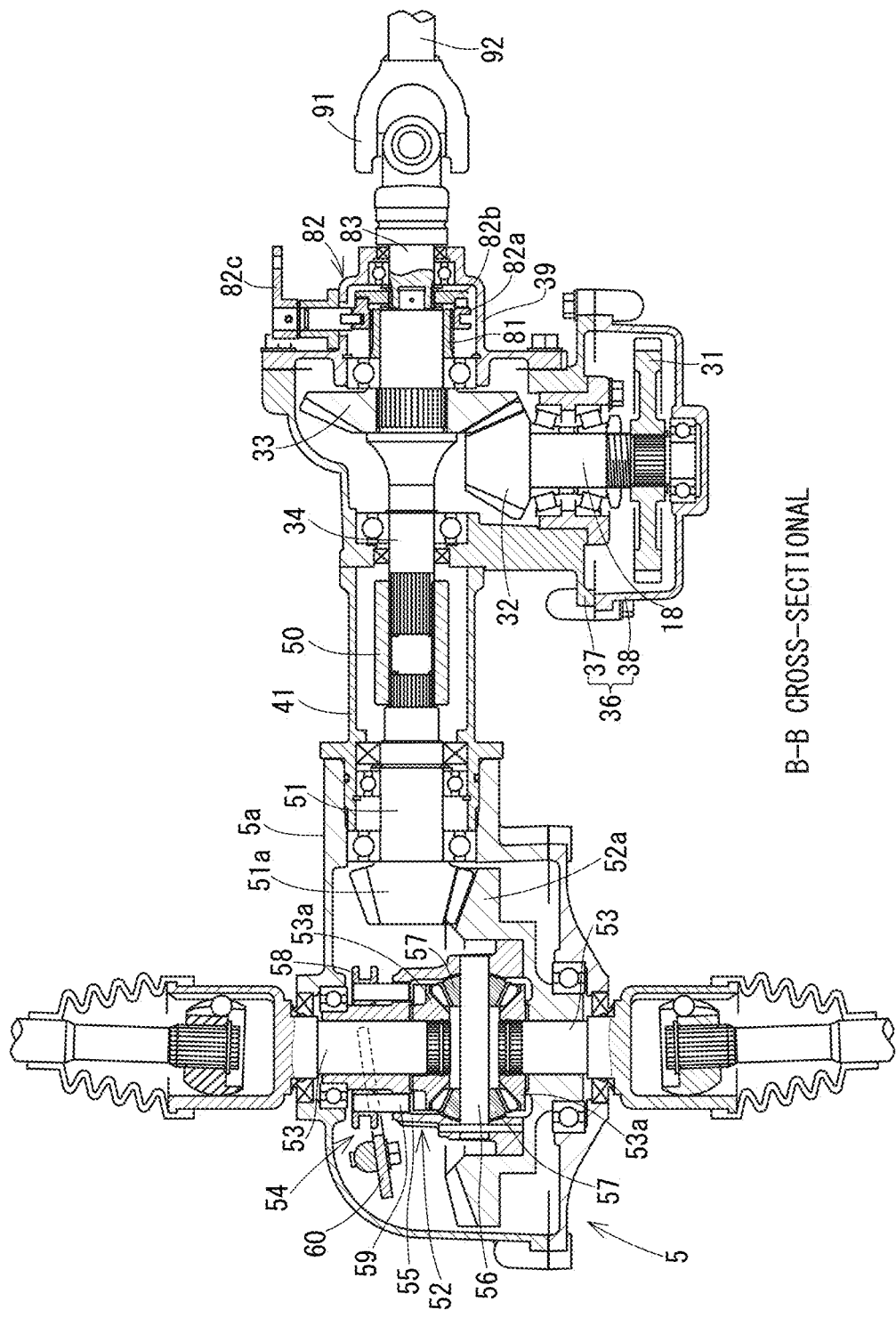
FIG. 7 is a cross-sectional view taken along the line B-B in FIG. 6.

As shown in FIG. 7, the rear wheel differential mechanism 52 comprises a differential case 55 that is rotatably supported in the rear axle drive housing 5a so as to have the same rotational axis as the output shaft 53, a bevel ring gear 52a which is fixed to the differential case 55, a pinion shaft 56 that is arranged orthogonal to the rotation axis of the differential case 55 and rotates integrally with the differential case 55, pinions 57, 57 that are rotatably supported by the pinion shaft 56, and differential side gears 53a, 53a that are fixed to the ends of output shafts 53, 53 and mesh with the pinions 57, 57, and a differential lock mechanism 54 that locks the rear wheel differential mechanism 52.

The differential lock mechanism 54 comprises a differential lock slider 58 provided on the outer periphery of the cylindrical portion of the differential case 55 opposite to the side where the bevel ring gear 52a is fixed, a differential lock slider 58 which is non-rotatable and axially slidable relative to the differential case 55, and an engaging claw 59 that is fixed to the differential lock slider 58 with its front end engaging with the left differential side gear 53a. The differential lock slider 58 is linked to the differential lock lever 60, through the operation of which, the differential lock slider 58 slides and the engaging claw 59 is locked to the left differential side gear 53a, and the differential case 55 and the output shaft 53 are connected with each other in a relatively non-rotatable manner, the rear wheel differential mechanism 52 is locked and the left and right output shafts 53, 53 are driven at the same rotational speed.

As shown in FIG. 1 and FIG. 2, the front axle drive device 7 provides support, in a front axle drive housing 7a serving as a housing, to an input shaft 71 extending in the longitudinal direction of the vehicle body in a plan view, and to a pair of left and right output shafts 73 extending in the horizontal direction. The input shaft 71 is supported in a front-raised orientation (with the front portion in the higher position and the rear portion in the lower position), and the rear end portion of the input shaft 71 protrudes rearward from the front axle drive housing 7a to connect to the front end portion of the second front wheel power transmission shaft 94 via the shaft coupling 95. The second front wheel power transmission shaft 94 extends along the longitudinal direction of the vehicle body at the center of the vehicle width, and is disposed on the same axial center as the input shaft 71, in a front-raised orientation (with the front portion in the higher position and rear portion in the lower position).

Respective output shaft 73 of the front axle drive device 7 protrudes left- and right-ward from the front axle drive housing 7a and is interlocked and connected to the front axle 6a of respective left and right front wheel 6 via a universal joint and a transmission shaft. A front wheel differential mechanism 72 is housed in the front axle drive housing 7a, and the left and right output shafts 73 are connected to each other through the front wheel differential mechanism 72 to operate differentially. A bevel ring gear 72a as an input gear of the front wheel differential mechanism 72 meshes with a bevel pinion gear 71a which is fixed to the front end of the input shaft 71.

As shown in FIG. 1 and FIG. 2, both the left side surface of the main body of the engine 1 and the left side surface of the gear transmission housing 36 that is the housing of the gear transmission 3 are fixed to the right side surface of the belt transmission housing 2a that is the housing of the belt transmission device 2. A driving pulley 12 and a driven pulley 13 are provided side by side in the belt transmission housing 2a, and a belt 14 as an endless body is wound around the driving pulley 12 and the driven pulley 13.

The power output shaft 11 of the engine 1 extending in the horizontal direction of the vehicle body and the power input shaft 15 of the gear transmission 3 are arranged to extend horizontally in the belt transmission housing 2a. The power output shaft 11 is a rotation center axis (pulley shaft) of the drive pulley 12, and the power input shaft 15 is a rotation center axis (pulley shaft) of the driven pulley 13. The belt transmission 2 is a continuously variable transmission (CVT) configured to change the output/input rotational speed ratio continuously by changing the width of the pulley grooves of the pulleys 12 and 13 according to the change in the rotational speed of the engine 1.

The gear transmission 3 will be described with reference to FIG. 1 to FIG. 9. In the gear transmission housing 36, a power input shaft 15, a transmission shaft 16, an idle shaft 17 (see FIG. 6), and an intermediate shaft 18 extending in the horizontal direction of the vehicle body are arranged to extend in parallel with each other in the horizontal direction of the vehicle body. A front and rear wheel drive shaft 34 extending in the longitudinal direction of the vehicle body is supported in the lower part of the gear transmission housing 36 in a front-lowered orientation (with the front portion in the lower position and rear portion in the higher position).

The gear transmission housing 36 is configured by joining a left housing 37 and a right housing 38. The left housing 37 rotatably supports the left end portions of the shafts 15, 16, 17, and 18 through the respective bearings. The right housing 38 rotatably supports the right end portions of the shafts 15, 16, 17, and 18 through the respective bearings. The power input shaft 15 protrudes left-ward from the left housing 37 from the left end portion.

The rear end side of the front and rear wheel drive shaft 34 is rotatably supported by the lower portion of the left housing 37 via a bearing, and the rear end portion protrudes rearward from the left housing 37. The front end side of the front and rear wheel drive shaft 34 is rotatably supported via a bearing in a clutch housing 39 which is attached to the left lower portion of the front surface of the left housing 37, and the front end portion protrudes forward from the left housing 37.

Figure 5:
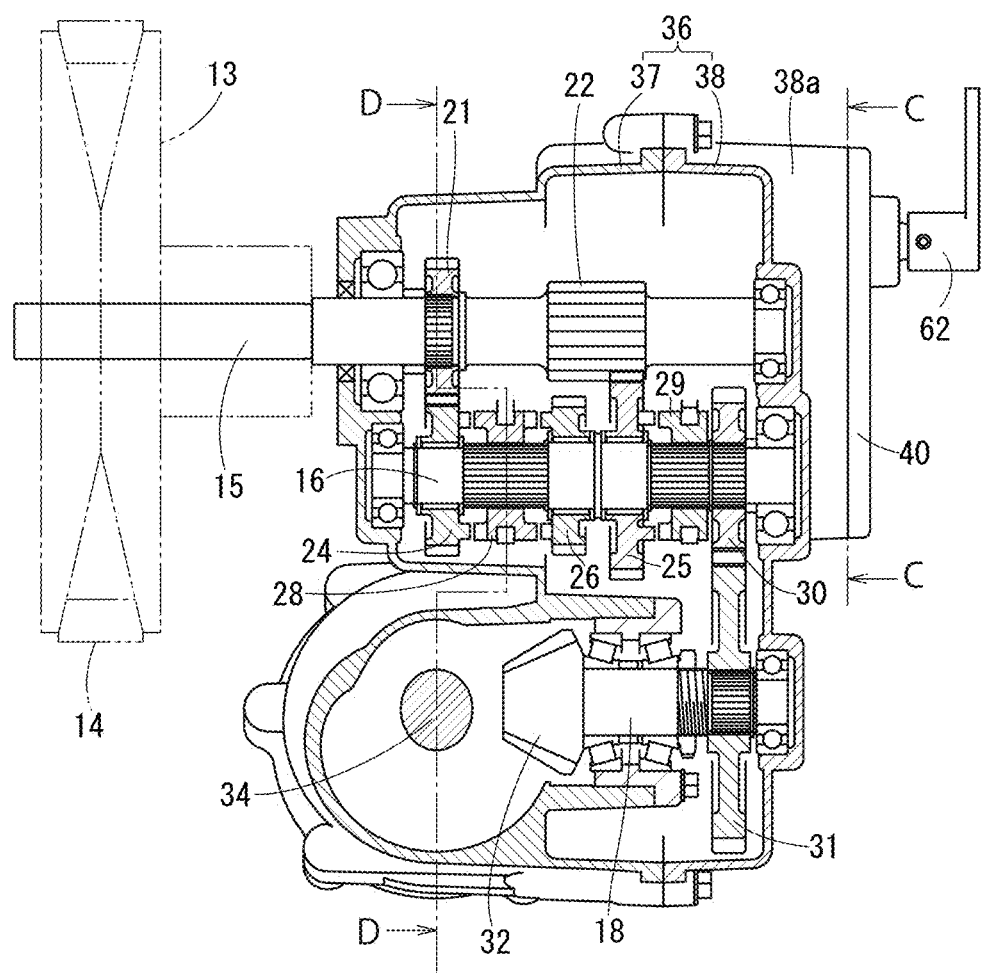
FIG. 5 is a cross-sectional view taken along the line A-A in FIG. 3.

As shown in FIG. 2 and FIG. 5, the left end portion of the power input shaft 15 protruding leftward from the upper left side of the left housing 37 is the central axis (pulley axis) for the rotation of the driven pulley 13 of the belt transmission device 2 in the belt transmission housing 2a. A forward high speed drive gear 21 and a forward low speed and reverse drive gear 22 are fixed (or integrally formed) in the order from left to right in the gear transmission housing 36 onto the power input shaft 15.

A forward high-speed driven gear 24, a reverse driven gear 26, and a forward low-speed driven gear 25 are mounted on the transmission shaft 16 in the order from left to right, in such a manner that all of which are rotatable relative to the transmission shaft 16. The forward high speed driven gear 24 meshes with the forward high speed drive gear 21. The forward low speed driven gear 25 meshes with the forward low speed and reverse drive gear 22. The reverse driven gear 26 meshes with an idle gear 27 (see FIG. 6) which is supported by the idle shaft 17, and the idle gear 27 meshes with the forward low speed and reverse drive gear 22.

A first clutch slider 28 that is provided at a position between the forward high-speed driven gear 24 and the reverse driven gear 26 and a second clutch slider 29 that is provided on the right side of the forward low-speed driven gear 25 are mounted onto the transmission shaft 16 in such a manner that the first clutch slider 28 and the second clutch slider 29 can slide in the axial direction and cannot rotate relative to the transmission shaft 16. The clutch sliders 28 and 29 slide by the rotation of a shift drum 61 (described later) according to the operation of a speed change operation tool (lever, pedal, dial, etc.) provided in the vehicle 100. The first clutch slider 28 can be switched to either one of the three positions including a forward high speed position at which the forward high speed driven gear 24 is to be meshed with, a reverse position at which the reverse driven gear 26 is to be meshed with, and a neutral position at which no gear is to be meshed with. The second clutch slider 29 can be switched between two positions, namely a forward low speed position at which the forward low speed driven gear 25 is to be meshed with and a neutral position at which no gear is to be meshed with.

Thus, the gear transmission 3 is configured to switch to either one of the states among which the transmission shaft 16 is driven at a low speed in the forward rotation direction in a forward low speed state, at a high speed in the forward rotation direction in a forward high speed state, in the reverse rotation direction in a reverse drive state, and a neutral state where the power transmission to the transmission shaft 16 is interrupted.

In the gear transmission housing 36, the intermediate drive gear 30 that is fixed to the transmission shaft 16 at a position on the right side of the second clutch slider 29 is engaged to an intermediate driven gear 31 at the right end portion of the intermediate shaft 18 that is supported by the lower portion in the gear transmission housing 36. A fixed intermediate driven gear 31 is engaged. A bevel pinion 32 that is fixed to the left end portion of the intermediate shaft 18 meshes with a bevel gear 33 that is fixed to the middle portion of the front and rear wheel drive shaft 34.

As shown in FIG. 2 to FIG. 7, the rear end portion of the front and rear wheel drive shaft 34 that extends in the longitudinal direction of the vehicle body at the vehicle width center portion and is supported in a front-lowered orientation, is connected to an input shaft 51 as an input of the rear wheel differential mechanism 52, by such as a cylindrical shaft coupling 50. The input shaft 51 extends along the longitudinal direction of the vehicle body at the center of the vehicle width, and is disposed on the same axial center as the front and rear wheel drive shaft 34, in a front-lowered orientation (with the front portion in the lower position and rear portion in the higher position).

The connecting portion between the front and rear wheel drive shaft 34 and the input shaft 51 is covered with a cylindrical connecting cover 41. A front end portion of the connecting cover 41 is bolted to a lower left portion of the rear surface of the gear transmission 3. The rear end portion of the connecting cover 41 is bolted to the front surface of the rear axle drive housing 5a.

Figure 6:
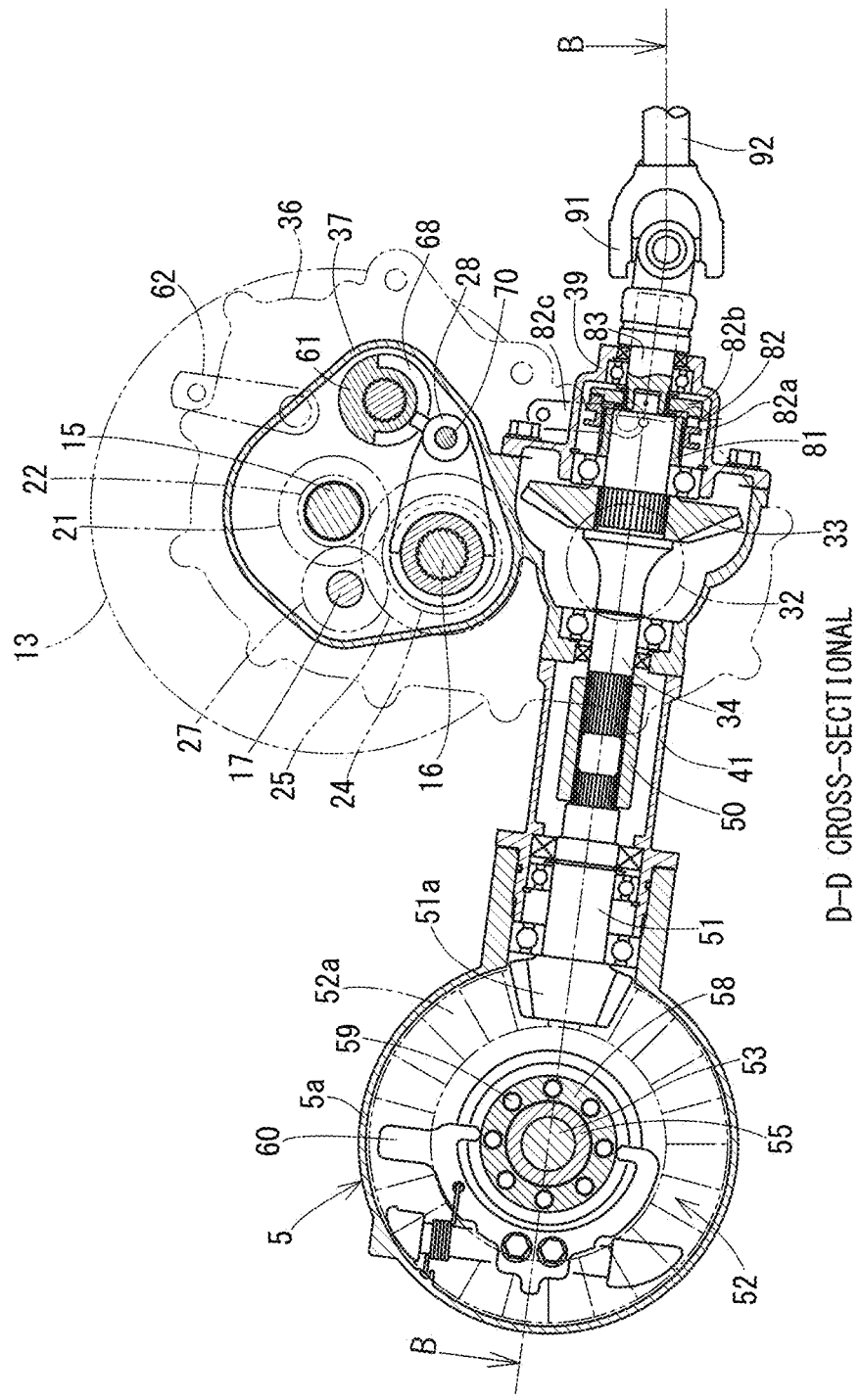
FIG. 6 is a cross-sectional view taken along the line D-D in FIG. 4.

As shown in FIG. 2, FIG. 6 and FIG. 7, the front end portion of the front and rear wheel drive shaft 34 protruding forward from the left housing 37 is accommodated in a clutch housing 39. For example, a press-fit torque limiter 81 is connected to the front end of the front and rear wheel drive shaft 34. The torque limiter 81 consists of a cylindrical member that is fitted to the front end portion of the front and rear wheel drive shaft 34, and when a high load is applied to the connection between the front and rear wheel drive shaft 34 and the torque limiter 81 when the vehicle body jumps and lands when traveling on rough terrain, the cylindrical member constituting the torque limiter 81 will slide on the front and rear wheel drive shafts 34 (the torque limiter 81 and the front and rear wheel drive shafts 34 rotate relative to each other), therefore protecting the engine 1 and the power transmission mechanism 200 from the sudden load.

Also, in the clutch housing 39, a front wheel output shaft 83 extending in the longitudinal direction is rotatably supported via a bearing in front of the front and rear wheel drive shaft 34. The front wheel output shaft 83 is supported in a front-lowered orientation (with the front portion in the lower position and rear portion in the higher position), and is disposed on the same axis as the front and rear wheel drive shaft 34. A clutch 82 such as a meshing clutch is interposed between the torque limiter 81 and the rear end of the front wheel output shaft 83.

The clutch 82 comprises a first clutch member 82a that is fitted in a relatively non-rotatable manner to the outer periphery of the torque limiter 81, and a second clutch member 82b that is fitted in a relatively non-rotatable manner to the outer circumference of the rear end portion of the front wheel output shaft 83. The first clutch member 82a is slidable in the axial direction on the outer peripheral side of the torque limiter 81 by the operation of the clutch lever 82c. The first clutch member 82a and the second clutch member 82b are engaged with each other, so that the rotation of the front and rear wheels drive shaft 34 is transmitted to the front wheel output shaft 83 via the torque limiter 81 and the clutch 82, and the first clutch member 82a and the second clutch member 82b are separated from each other, so that power transmission between the front and rear wheels drive shaft 34 and the front wheel output shaft 83 is interrupted.

The front end of the front wheel output shaft 83 protrudes forward from the clutch housing 39 and is connected to the universal joint 91. The front end side of the universal joint 91 is connected to the rear end of the first front wheel power transmission shaft 92 that extends in a substantially horizontal orientation along the longitudinal direction of the vehicle body at the center of vehicle width. The first front wheel power transmission shaft 92 extends forward through the space beneath the engine 1.

The engine lower portion 1a (for example, an oil pan) of the engine 1 is provided with a notch-like or groove-like recess extending in the longitudinal direction, and at the position of which a middle portion (near the rear end portion) is arranged. Accordingly, the first front wheel power transmission shaft 92 is configured to pass through the space beneath the engine 1, making it possible for the engine 1 to be disposed at a lower position, and the center of gravity of the vehicle 100 can be lowered to achieve improved stability.

The front end portion of the first front wheel power transmission shaft 92 is disposed in front of the engine 1 in a plan view, and is connected via the universal joint 93, the second front wheel power transmission shaft 94 and the shaft coupling 95 to a rear end portion of an input shaft 71 as an input portion of a front wheel differential mechanism 72 in the front axle drive device 7.

In the gear transmission 3, the clutch 82 is engaged to transmit the output of the gear transmission 3 to the left and right output shafts 73 of the front axle drive device 7, that is, the left and right front wheels 6. The vehicle 100 travels by driving the left and right rear wheels 4 and the left and right front wheels 6, that is, it travels by four-wheel driving. By disengaging the clutch 82, the output of the gear transmission 3 is not transmitted to the left and right front wheels 6, and the vehicle 100 travels by driving only the left and right rear wheels 4, that is, it travels by two-wheel driving.

Next, the drive mechanism of the clutch sliders 28, 29 will be described with reference to FIG. 8. A pair of shift forks 63, 64 that engage with a shift drum 61 that rotates in conjunction with the shift lever 62 are connected to the clutch sliders 28 and 29 that are fitted to the transmission shaft 16 in such a manner as to be slidable in the axial direction. The shift lever 62 is connected upward to the right end portion of the shift lever shaft 65 rotatably supported at the upper front portion of the right side surface of the gear transmission housing 36, and rotates around the shift lever shaft 65 in conjunction with the operation of a shift operation tool (lever, pedal, dial, etc.) not shown in the drawing.

Figure 9:
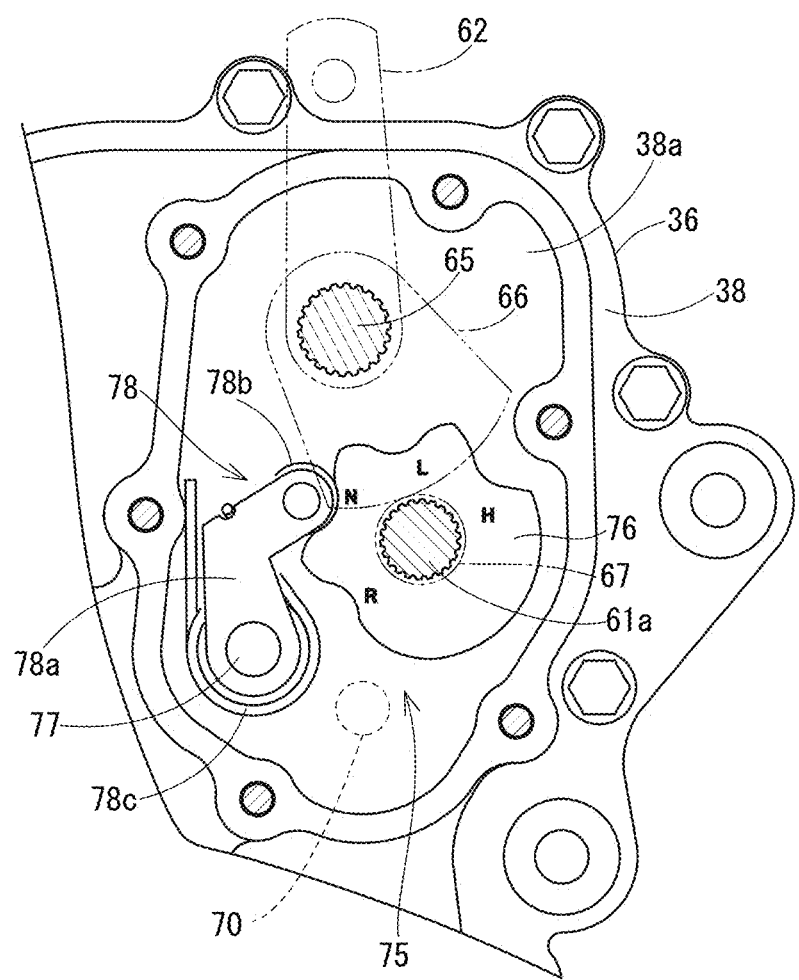
FIG. 9 is an enlarged sectional view taken along the line C-C of FIG. 5.

As shown in FIG. 9, a drive gear 66 composed of a fan-shaped gear that is fixed to the left end portion of the shift lever shaft 65 meshes with a shift gear 67 that is fixed to the right end portion 61a of the shift drum 61. As the shift lever 62 rotates, the shift lever shaft 65 and the drive gear 66 rotate, and the shift gear 67 and the shift drum 61 rotate in conjunction therewith.

Further, a shift drum positioning mechanism 75 is connected to the right end portion 61a of the shift drum 61. The shift drum positioning mechanism 75 comprises star-shaped plate 76 that is fixed to the right end of the shift drum 61 on the left side of the shift gear 67, and a stopper member 78 that is rotatably supported by a supporting column 77 that is fixed to the right housing 38 of the gear transmission housing 36. The star-shaped plate 76 has four concave portions on the outer periphery. The stopper member 78 comprises a stopper arm 78a that is rotatably supported by the supporting column 77, a stopper roller 78b that is rotatably supported by the front portion of the stopper arm 78a and a coil spring 78c that urges the stopper arm 78a so as to push the stopper roller 78b to slide to the outer peripheral surface of the star-shaped plate 76.

When the shift drum 61 drives to rotate with the rotation of the shift lever 62, the star-shaped plate 76 also rotates together with the shift drum 61. Meanwhile, the stopper roller 78b rides onto the convex portion on the outer periphery of the star-shaped plate 76, with the stopper arm 78a and the stopper roller 78b being pushed outward, and the stopper roller 78b will then move into the recess next to the original recess of the star plate 76 due to the biasing force by the coil spring 78c. This way, when the shift drum 61 is positioned at each of the positions described above, the shift drum positioning mechanism 75 is configured to apply a rotational resistance to the shift drum 61.

Here, the right end portion 61a of the shift drum 61, the shift lever shaft 65, the drive gear 66, the shift gear 67 and the shift drum positioning mechanism 75 are accommodated in a shift gear chamber 38 which is provided at the upper front portion of the right side surface of the gear transmission housing 36. The shift gear chamber 38a is separated by a partition wall 38b from the internal space of the gear transmission housing 36 in which the main body of the shift drum 61 and the gears 21, 22, 24, 25, 26, 27 and the like are accommodated. The shift gear chamber 38a is covered with a detachable shift gear chamber cover 40, and the right end portion of the shift lever shaft 65 protrudes right-ward from the shift gear chamber cover 40.

As described above, the drive gear 66 and the shift drum positioning mechanism 75 are provided in the shift gear chamber 38a that is separated from the internal space of the gear transmission housing 36, where the main body of the shift drum 61 covered with the detachable shift gear chamber cover 40 is accommodated. As a result, the number of assembly steps can be reduced and maintainability can be improved.

Figure 8:
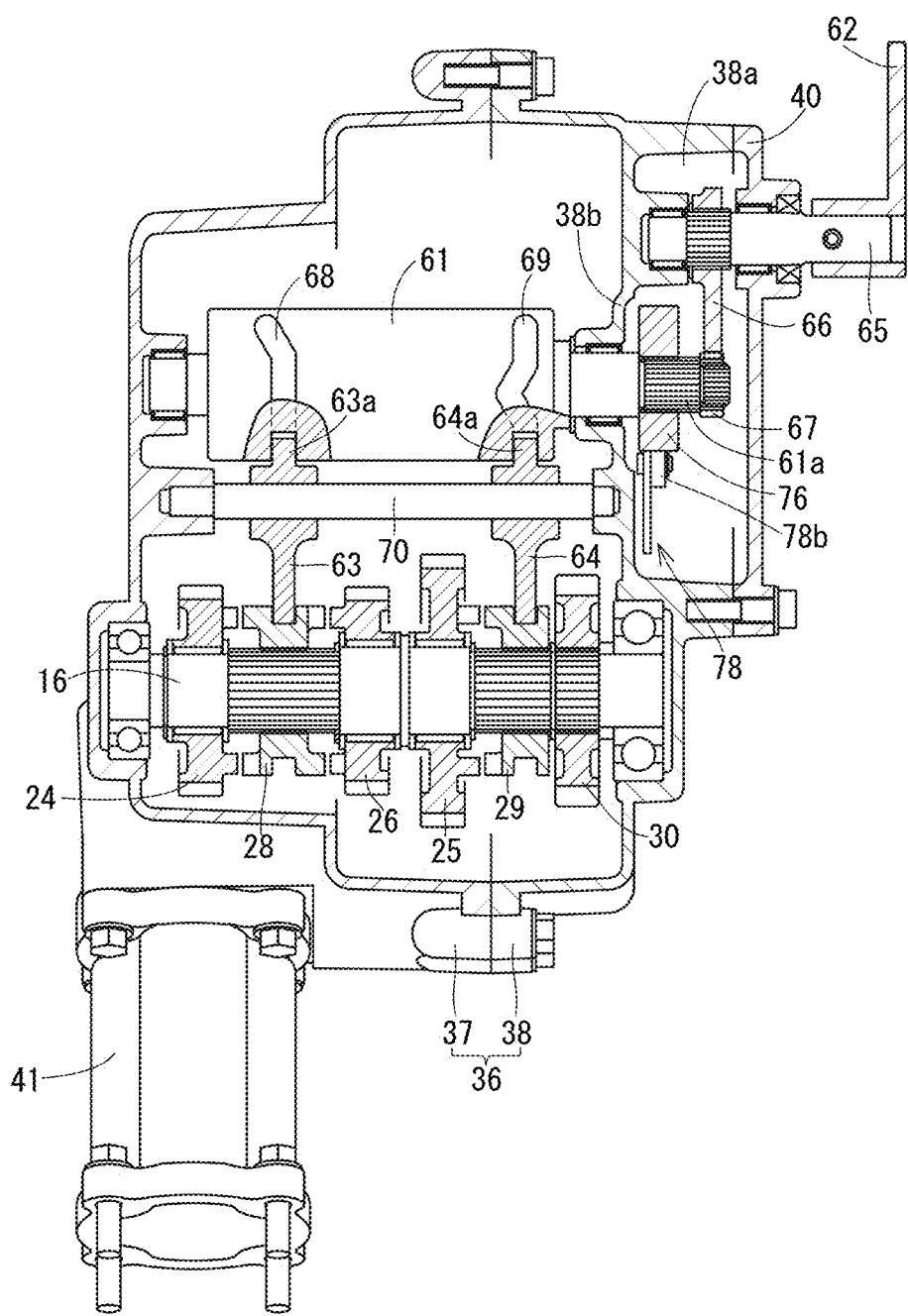
FIG. 8 is a cross-sectional view taken along the line E-E of FIG. 3.

As shown in FIG. 8, the shift forks 63, 64 are slidably supported on a horizontally long shift fork shaft 70 that is provided in the gear transmission housing 36. A first shift pin 63a that is provided at one end of the first shift fork 63 engages with a first cam groove 68 that is provided in the shift drum 61, and a second shift pin 64a that is provided at one end of the second shift fork 64 engages with a second cam groove 69 that provided in the shift drum 61. The shift forks 63, 64 are given with the step feed according to the cam grooves 68, 69 by the intermittent rotation of the shift drum 61, and the gear transmission 3 is set to either one of the forward low speed state, the forward high speed state, the reverse drive state, and the neutral state.

As shown in FIG. 1 to FIG. 8, the power transmission mechanism 200 for the four-wheel drive vehicle 100 according to the present embodiment is so configured that the engine 1 and the gear transmission 3 are separated from each other, that the general-purpose engine 1 can be adopted. In addition, the engine 1 is disposed at a low position so that the center of gravity of the vehicle 100 is lowered to improve the stability. Furthermore, since the power transmission mechanism 200 allows the front wheel power transmission shaft 92 to pass through the space beneath the engine 1 along the longitudinal direction of the vehicle body at the center of the vehicle width of the vehicle 100, the driving path from the front transmission differential mechanism 72 to the gear transmission 3 is shortened, the front wheel drive layout can therefore be simplified, and noise reduction and improved transmission efficiency is achieved.

As shown in FIG. 1 to FIG. 7, in the power transmission mechanism 200, an input shaft 51 as an input part of the rear wheel differential mechanism 52 is positioned above the lower surface of the engine 1, and the front and rear wheel drive shaft 34 is supported by the gear transmission 3 to in a front-lowered orientation. As a result, the input shaft 51 of the rear wheel differential mechanism 52 is supported in a front-lowered manner while securing the rear wheel differential mechanism 52 to be located at a higher position, the input shaft 51 of the rear wheel differential mechanism 52 could be provided on the same axis as the front and rear wheel drive shaft 34. Moreover, the rear end portion of the front and rear wheel drive shaft 34 and the input shaft 51 of the rear wheel differential mechanism 52 are connected by a cylindrical shaft coupling 50 such as a coupling, whereby the efficiency of power transmission from the front and rear wheel drive shaft 34 to the rear wheel differential mechanism 52 can be improved and noise can be suppressed.

As shown in FIGS. 1 to FIG. 5, the power transmission mechanism 200 is provided with a power output shaft 11 that extends in the horizontal direction of the vehicle body on the engine 1 and a power input shaft 15 that extends in the horizontal direction of the vehicle body on the gear transmission 3. The gear transmission 3 is provided separated from and behind the engine 1, and the power output shaft 11 and the power input shaft 15 are connected by a belt 14. This way, the general-purpose engine 1 can be adopted, and the output of the engine 1 can be input to the gear transmission 3 via the belt 14 provided on the side of the engine 1 and the gear transmission 3.

Next, another embodiment of the power transmission mechanism 200 will be described with reference to FIGS. 10-FIG. 13. In the present embodiment, the same components as those in the above embodiment are denoted by the same reference numerals, and detailed description thereof is omitted.

In this embodiment, a hypoid gear mechanism is used for the rear wheel differential mechanism 52, where a hypoid gear 52b as an input gear of the rear wheel differential mechanism 52 engages with the hypoid pinion 51b that is fixed to the rear end of the input shaft 51. The input shaft 51 as an input part of the rear wheel differential mechanism 52 is located at the height substantially the same as the connection location of the front and rear wheel drive shaft 34 and the first front wheel power transmission shaft 92, and is supported to the gear transmission 3 in such a manner that the front and rear wheel drive shaft 34 that is provided at the lower part of the gear transmission 3 is substantially horizontal oriented.

The input shaft 51 of the rear wheel differential mechanism 52 is supported substantially horizontally by the rear axle drive housing 5a. The two axes of the input shaft 51 and the output shaft 53 are positioned so as to be twisted from each other. The rear end portion of the front and rear wheel drive shaft 34 and the front end portion of the input shaft 51 of the rear wheel differential mechanism 52 are connected by a cylindrical shaft coupling 50 such as a coupling. This way, the efficiency of power transmission from the front and rear wheel drive shaft 34 to the rear wheel differential mechanism 52 can be improved, and noise can be suppressed.

Further, even if the interval in the longitudinal direction between the gear transmission 3 and the rear wheel differential mechanism 52 is changed, without significantly changing the structure of the gear transmission 3 and the rear wheel differential mechanism 52, the rear end potion of the front and rear wheel drive shaft 34 can be connected to an input shaft 51 as an input portion of the rear wheel differential mechanism 52, and the versatility of the power transmission mechanism 200 is hence improved. For example, a change in the interval in the longitudinal direction between the gear transmission 3 and the rear wheel differential mechanism 52 can be dealt with by adjusting the length of either or both of the front and rear wheel drive shaft 34 and the input shaft 51. In addition, the length of the connection cover 41 is also changed along with the change of the interval mentioned above.

Further, in the present embodiment, by using a hypoid gear mechanism as the input gear mechanism of the rear wheel differential mechanism 52, the rear wheel differential mechanism 52 is secured at a higher position (as is the position of the output shaft 53), while the input shaft 51 of the rear wheel differential mechanism 52 can be supported to orient substantially horizontally and to the lower part of the rear wheel differential mechanism 52. That is, by using the hypoid gear, the degree of freedom of the height position of the output shaft 53 is increased. Further, the front wheel power transmission shaft 92 is disposed to orient substantially horizontally and provided on the same axis as the front and rear wheel drive shaft 34, so that the front end of the front and rear wheel drive shaft 34 and the rear end of the first front wheel power transmission shaft 92 can be connected to each other by a cylindrical shaft coupling 96, so that the efficiency of power transmission from the front and rear wheel drive shaft 34 to the first front wheel power transmission shaft 92 can be improved and noise can be suppressed.

Figure 14:
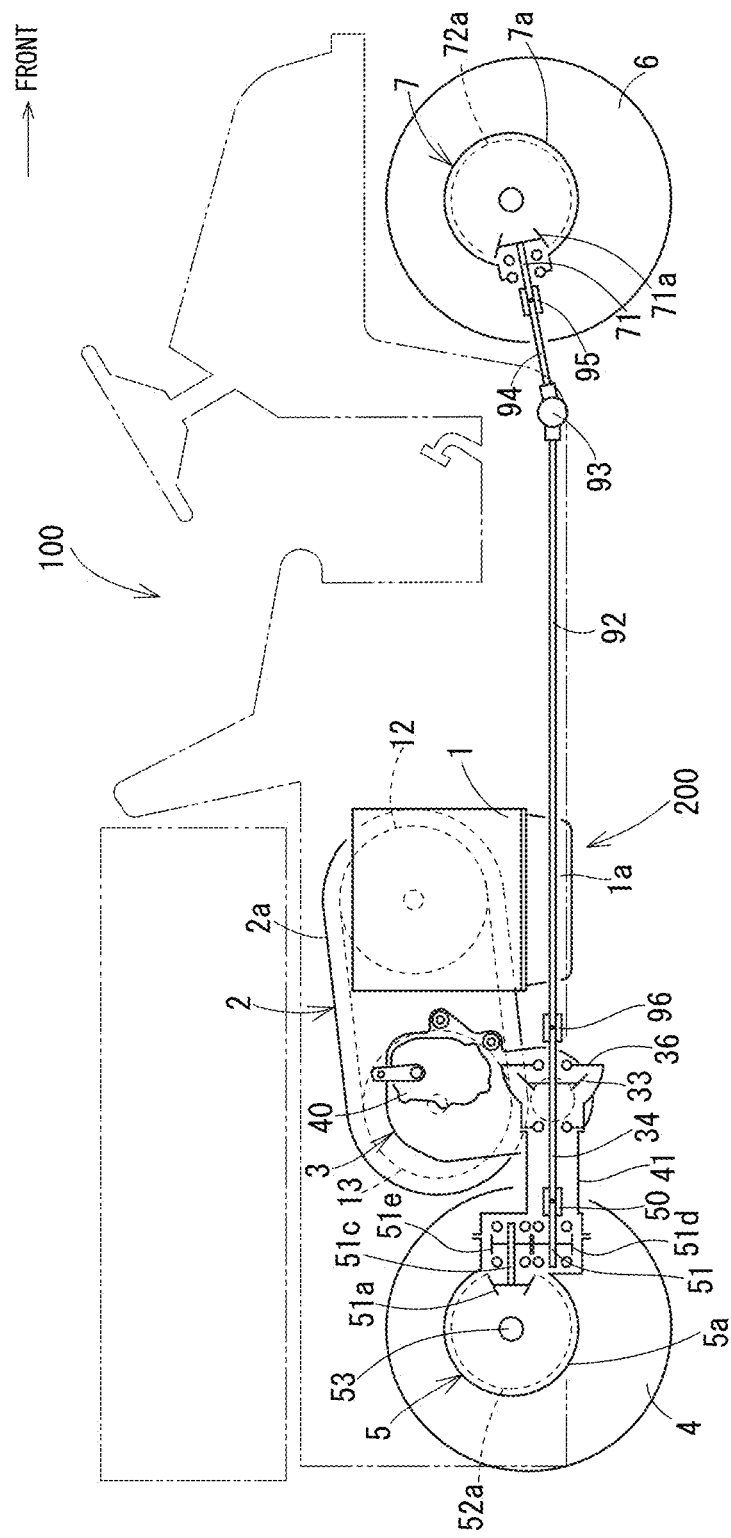
FIG. 14 is a side view schematically showing a power transmission mechanism of a vehicle according to yet another embodiment of the present invention.

Next, still another embodiment of the power transmission mechanism 200 will be described with reference to FIG. 14. In the present embodiment, the same components as those in the embodiment shown in FIGS. 10 to FIG. 13 are denoted by the same reference numerals, and detailed description thereof is omitted.

In this embodiment, a parallel shaft gear mechanism having an input shaft 51 and a relay shaft 51c is used as the input gear mechanism of the rear wheel differential mechanism 52. Both the input shaft 51 and the relay shaft 51c extend along the longitudinal direction of the vehicle body and are arranged in parallel with each other and orient substantially horizontally, and the relay shaft 51 *c* is disposed above the input shaft 51. In the rear wheel differential mechanism 52, the input shaft 51 and the output shaft 53 are so positioned that their axes are twisted from each other.

The input shaft 51 is supported on the same axial center as the front and rear wheel drive shaft 34 that is supported to orient substantially horizontally. The front end portion of the input shaft 51 is connected to the rear end portion of the front and rear wheel drive shaft 34 via the shaft coupling 50. A drive gear 51d that is fixed to the middle part of the input shaft 51 is engaged with a driven gear 51e that is fixed to the middle part of the relay shaft 51c. A bevel pinion gear 51a that is fixed to the rear end of the relay shaft 51c meshes with a bevel ring gear 52a as an input gear of the rear wheel differential mechanism 52. The rotational power of the front and rear wheel drive shaft 34 is transmitted to the bevel ring gear 52a through the drive gear 51d, the driven gear 51e and the bevel pinion gear 51a.

Also in this embodiment, since the rear end portion of the front and rear wheel drive shaft 34 and the front end portion of the input shaft 51 of the rear wheel differential mechanism 52 are connected by the shaft coupling 50, the efficiency of power transmission from the front and rear wheel drive shaft 34 to the rear wheel differential mechanism 52 can be improved and noise can be suppressed. Further, even if the interval in the longitudinal direction between the gear transmission 3 and the rear wheel differential mechanism 52 is changed, without significantly changing the structure of the gear transmission 3 and the rear wheel differential mechanism 52, the rear end potion of the front and rear wheel drive shaft 34 can be connected to an input shaft 51 as an input portion of the rear wheel differential mechanism 52, and the versatility of the power transmission mechanism 200 is hence improved.

Further, by using a parallel shaft gear mechanism having an input shaft 51 and a relay shaft 51c as an input gear mechanism of the rear wheel differential mechanism 52, the rear wheel differential mechanism 52 is secured at a higher position (as is the position of the output shaft 53), while the input shaft 51 of the rear wheel differential mechanism 52 can be supported to orient substantially horizontally and to the lower part of the rear wheel differential mechanism 52.

Figure 10:
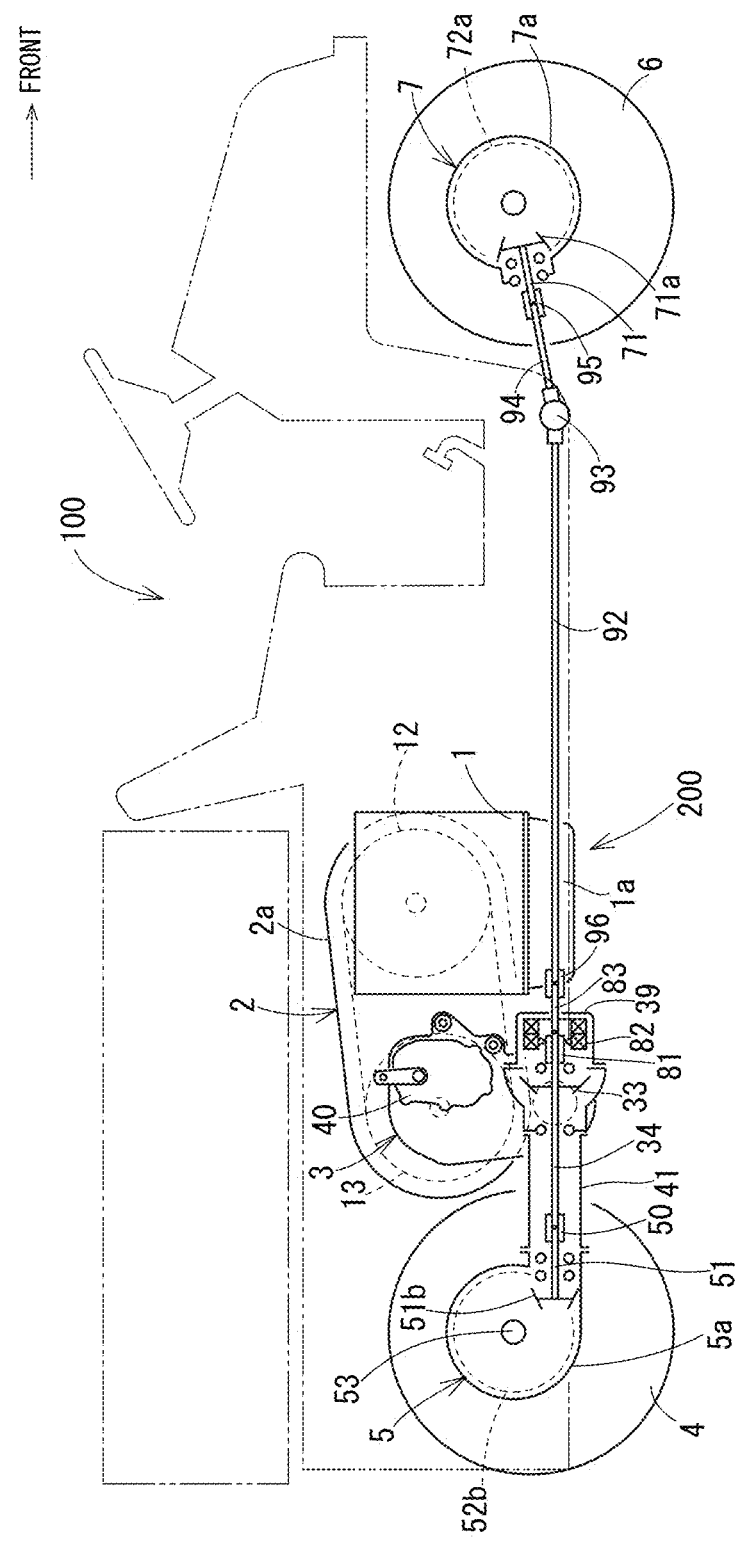
FIG. 10 is a side view schematically showing a power transmission mechanism of a vehicle according to another embodiment of the present invention.
Figure 11:
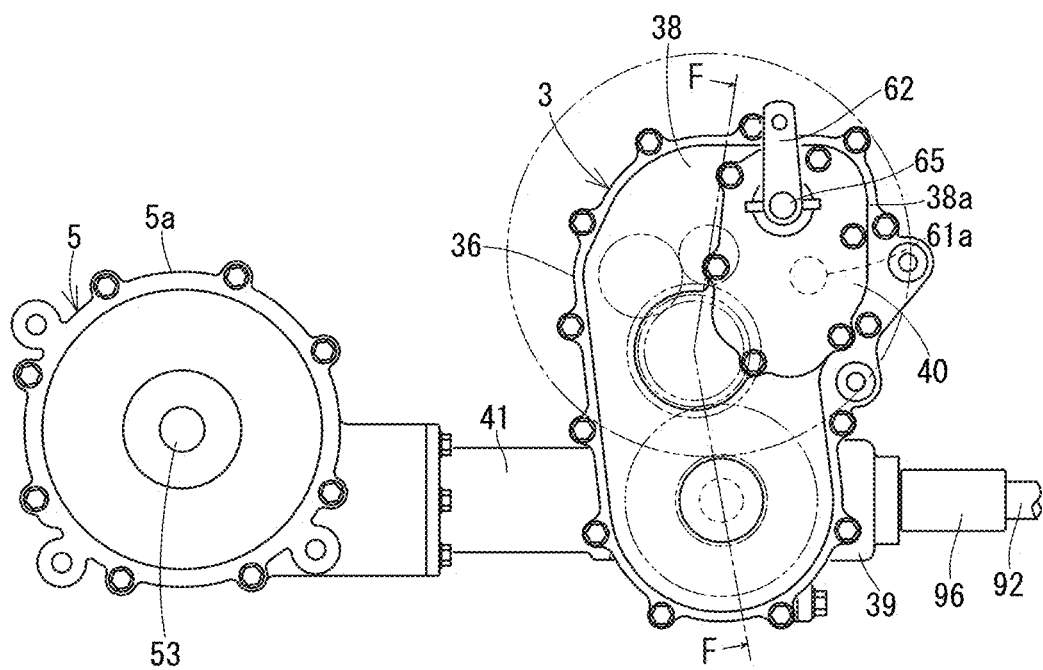
FIG. 11 is a right side view showing the gear transmission and the rear axle driving device of the embodiment.
Figure 12:
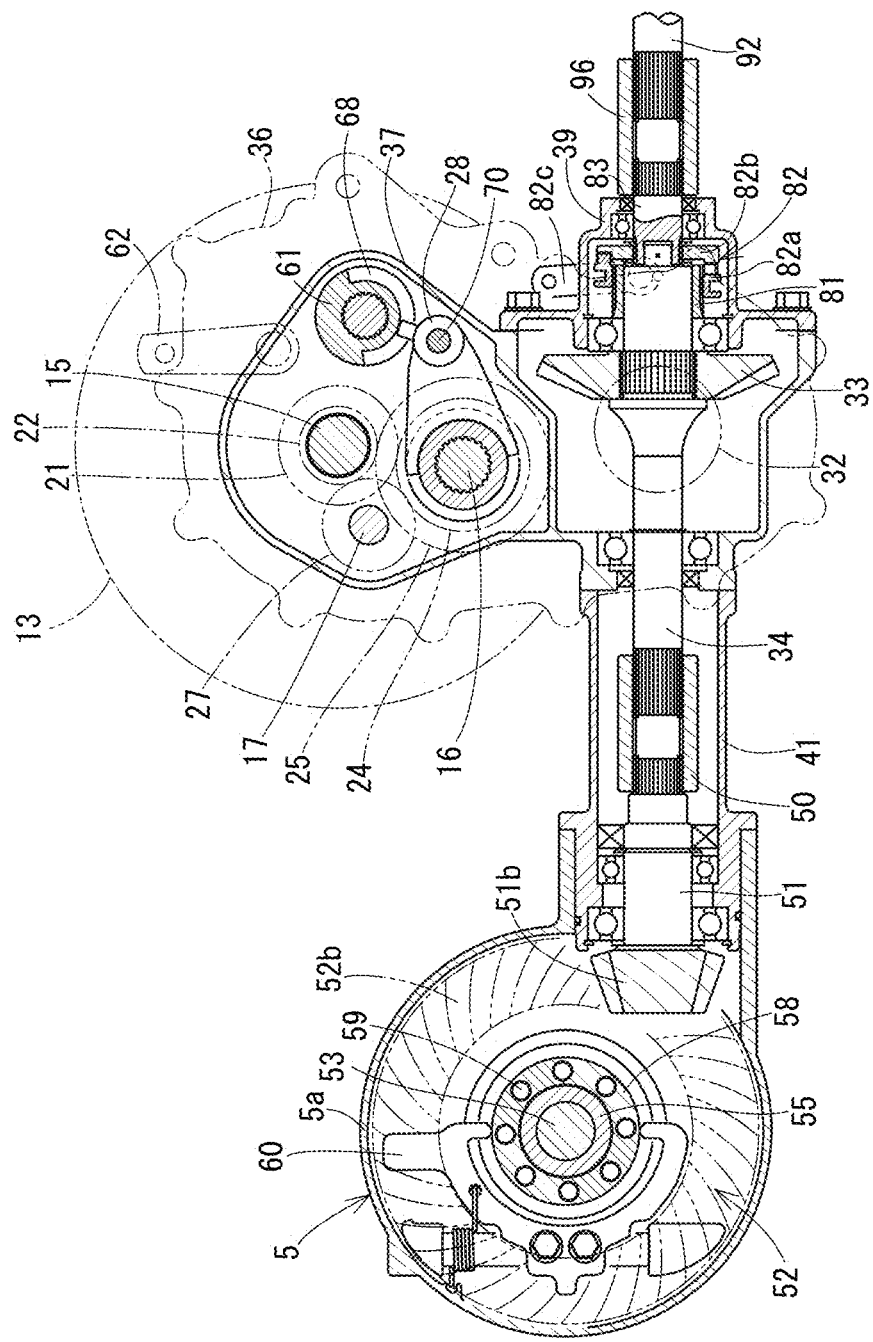
FIG. 12 is a longitudinal sectional view along the longitudinal direction of the gear transmission and the rear axle driving device.
Figure 13:
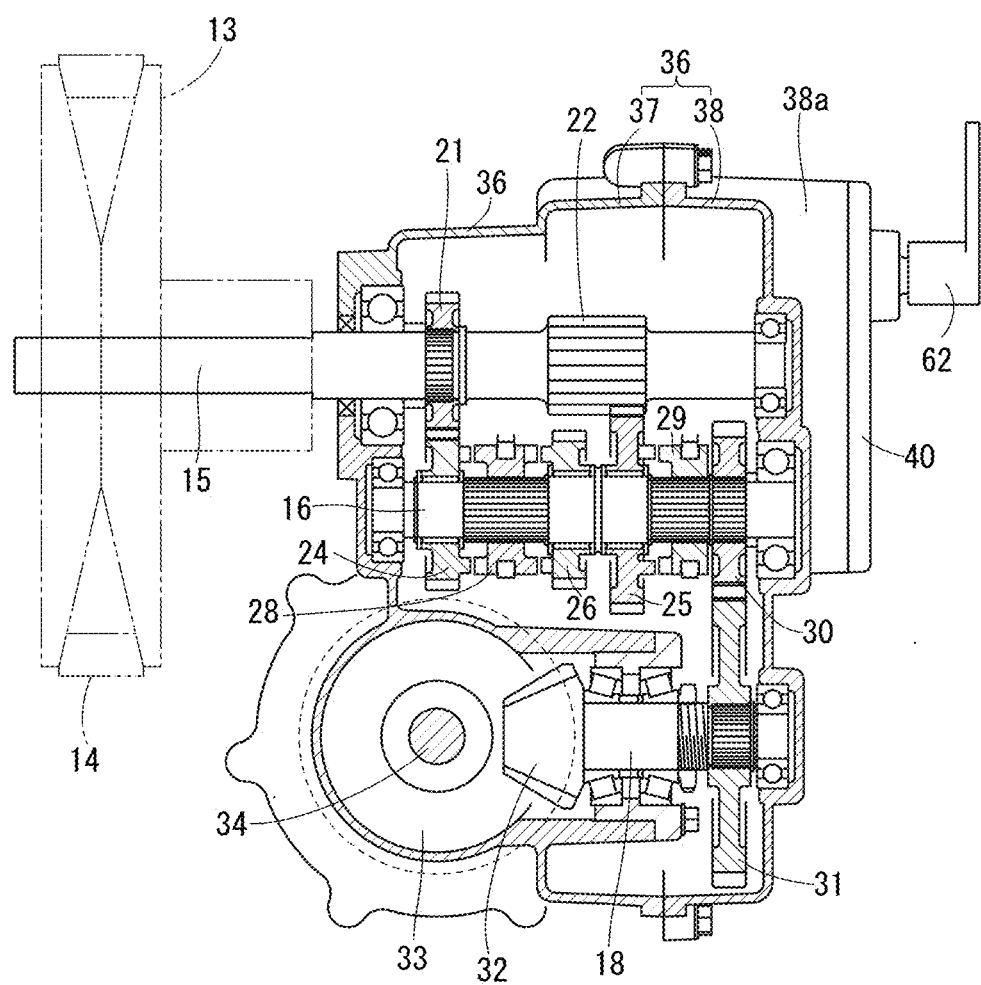
FIG. 13 is a cross-sectional view taken along the line F-F of FIG. 11.

In the present embodiment, the gear transmission 3 is not provided with the torque limiter 81, the clutch 82, the front wheel output shaft 83 nor the clutch housing 39 (see FIG. 1 and FIG. 10, etc.). The front end side of the front and rear wheel drive shaft 34 is rotatably supported by the gear transmission housing 36, and the front end portion of the front and rear wheel drive shaft 34 protrudes forward from the gear transmission housing 36. The front end portion of the front and rear wheel drive shaft 34 is connected to the rear end portion of the first front wheel power transmission shaft 92 which is on the same axis as the front and rear wheel drive shaft 34 via a cylindrical shaft coupling 96. The configuration in which the gear transmission 3 is not provided with either of the torque limiter 81, the clutch 82, the front wheel output shaft 83 and the clutch housing 39, or the like, can also be applied to those embodiments as shown in FIGS. 1 to FIG. 9 and in FIGS. 10 to FIG. 13.

The embodiments of the present invention have been described above, but the present invention can also be embodied in various ways. For example, it is possible to use an electric motor instead of the engine 1 as a prime mover. Further, as an alternative variation to the endless body, a chain transmission mechanism having no speed change function or an endless body of the belt transmission mechanism can be used instead of the belt 14 of the belt transmission device 2.

EXPLANATION OF SYMBOLS

1 Engine (prime mover)
3 Gear transmission (transmission)
5 Rear axle drive device
7 Front axle drive device
11 Power output shaft
14 Belt
15 Power input shaft
34 Front and rear wheel drive shaft
52 Rear wheel differential mechanism
72 Front wheel differential mechanism
92 First front wheel power transmission shaft (front wheel power transmission shaft)
100 Four-wheel drive vehicle
200 Power transmission mechanism

What is claimed:

1. A power transmission mechanism for a four-wheel drive vehicle comprising;
a prime mover;
a transmission disposed in the rear of the prime mover;
a front wheel differential mechanism disposed in front of the prime mover; and
a rear wheel differential mechanism disposed in the rear of the transmission;
wherein, the power of the prime mover is transmitted via the transmission to the front wheel differential mechanism and the rear wheel differential mechanism;
wherein, the transmission is equipped with a front and rear wheel drive shaft along a longitudinal direction of a vehicle body;
wherein, the transmission is provided separately from the prime mover and the rear wheel differential mechanism,
wherein, a rear end portion of the front and rear wheel drive shaft is connected to an input portion of the rear wheel differential mechanism,
wherein, a front end portion of the front and rear wheel drive shaft is connected to an input portion of the front wheel differential mechanism via a front wheel power transmission shaft extending in the longitudinal direction of the vehicle body and passing through a space beneath the prime mover;
wherein the input portion of the rear wheel differential mechanism is positioned above a bottom surface of the prime mover; and
wherein the front and rear wheel drive shaft is supported to the transmission in a front-lowered orientation, so that the front end portion of the front and rear wheel drive shaft is positioned beneath the rear end portion.

2. The power transmission mechanism for a four-wheel drive vehicle according to claim 1, wherein the prime mover is provided with a power output shaft extending in a horizontal direction of the vehicle body, and
the transmission is provided with a power input shaft extending in the horizontal direction of the vehicle body, with the transmission being configured to locate separated from and behind the prime mover, and
wherein the power output shaft and the power input shaft are connected with each other by an endless body.

3. The power transmission mechanism for a four-wheel drive vehicle according to claim 1, wherein a front end portion of the front wheel power transmission shaft is supported to the front wheel differential mechanism so that the front end portion is in a higher position and the rear end portion is in a lower position.

4. The power transmission mechanism for a four-wheel drive vehicle according to claim 1, wherein the front end portion of the front and rear wheel drive shaft is connected to the front wheel power transmission shaft via a universal joint, and the universal joint is arranged beneath an output shaft of the rear wheel differential mechanism.

5. The power transmission mechanism for a four-wheel drive vehicle according to claim 1, wherein the front wheel power transmission shaft comprises a first front wheel power transmission shaft and a second front wheel power transmission shaft;
wherein a front end portion of the second front wheel power transmission shaft is connected to a rear end portion of the first front wheel power transmission shaft via a universal joint;
wherein the front end portion of the first front wheel power transmission shaft is connected to the input portion of the front wheel differential mechanism; and
wherein the universal joint is arranged beneath an output shaft of the front wheel differential mechanism.

6. The power transmission mechanism for a four-wheel drive vehicle according to claim 1, wherein the front end portion of the front and rear wheel drive shaft is connected to a rear end portion of the front wheel power transmission shaft via a universal joint; and
wherein the universal joint is arranged behind the prime mover and in front of a housing that accommodates the transmission.

7. The power transmission mechanism for a four-wheel drive vehicle according to claim 1, wherein the prime mover comprises a power output shaft that extends in a horizontal direction of the vehicle body.

8. The power transmission mechanism for a four-wheel drive vehicle according to claim 7, wherein a lower portion of the prime mover is provided with a notch-like or groove-like recess extending in the longitudinal direction for passing the front wheel power transmission shaft.

\* \* \* \* \*